(12) United States Patent
Humble

(10) Patent No.: US 10,776,480 B2
(45) Date of Patent: Sep. 15, 2020

(54) PRODUCING VOLATILE PASSWORD HASHING ALGORITHM SALTS FROM HARDWARE RANDOM NUMBER GENERATORS

(71) Applicant: INTERNATIONAL BUSINESS MACHINES CORPORATION, Armonk, NY (US)

(72) Inventor: James Humble, Hartsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 15/943,117

(22) Filed: Apr. 2, 2018

(65) Prior Publication Data

US 2019/0303561 A1    Oct. 3, 2019

(51) Int. Cl.
| | |
|---|---|
| *G06F 21/46* | (2013.01) |
| *H04L 29/06* | (2006.01) |
| *H04L 9/08* | (2006.01) |
| *H04L 9/06* | (2006.01) |
| *G06F 7/58* | (2006.01) |
| *G06F 17/18* | (2006.01) |

(52) U.S. Cl.
CPC .............. *G06F 21/46* (2013.01); *G06F 7/58* (2013.01); *H04L 9/0643* (2013.01); *H04L 9/0668* (2013.01); *H04L 9/0866* (2013.01); *H04L 9/0869* (2013.01); *H04L 9/0872* (2013.01); *H04L 63/083* (2013.01); *H04L 63/102* (2013.01); *G06F 17/18* (2013.01)

(58) Field of Classification Search
CPC . G06F 21/46; G06F 7/58; G06F 17/18; H04L 63/083; H04L 63/102; H04L 9/0866; H04L 9/0872; H04L 9/0668; H04L 9/0643; H04L 9/0869; H04L 63/123; H04L 9/3236; H04L 9/0877; H04L 9/3226; H04L 9/3239
See application file for complete search history.

(56) References Cited

U.S. PATENT DOCUMENTS

| | | | |
|---|---|---|---|
| 6,539,479 B1* | 3/2003 | Wu | H04L 9/0844 380/227 |
| 9,860,056 B2 | 1/2018 | Greiner et al. | |
| 2006/0036857 A1* | 2/2006 | Hwang | G06F 21/31 713/168 |
| 2006/0104441 A1* | 5/2006 | Johansson | G06F 21/33 380/44 |
| 2006/0256962 A1* | 11/2006 | Ilnicki | G06F 7/58 380/46 |

(Continued)

FOREIGN PATENT DOCUMENTS

| | | |
|---|---|---|
| GB | 2484937 | 5/2012 |
| WO | 2009109959 | 9/2009 |

*Primary Examiner* — Huan V Doan
(74) *Attorney, Agent, or Firm* — Tutunjian & Bitetto, P.C.; Vazken Alexanian

(57) ABSTRACT

A computer-implemented method, computer program product, and system are provided. The method includes generating, by a password management system using a set of Hardware Random Number Generators (HRNGs), at least one salt based on statistics of a set of random numbers with given distributions generated by the set of HRNGs. The method further includes forming, by a processor, a hashed password based on the at least one salt.

16 Claims, 12 Drawing Sheets

(56) References Cited

U.S. PATENT DOCUMENTS

| | | |
|---|---|---|
| 2008/0263117 A1 | 10/2008 | Rose et al. |
| 2008/0298583 A1 | 12/2008 | Ahmed |
| 2010/0269061 A1* | 10/2010 | Cantor .................... G06F 40/18 |
| | | 715/780 |
| 2012/0278372 A1 | 11/2012 | Gribok et al. |
| 2015/0172272 A1* | 6/2015 | Levner ................. H04L 63/083 |
| | | 726/7 |
| 2018/0287793 A1* | 10/2018 | Khatib Zadeh ......... G06F 7/588 |
| 2019/0222419 A1* | 7/2019 | Adams .................... G06F 21/45 |

* cited by examiner

PRODUCING VOLATILE PASSWORD HASHING ALGORITHM SALTS FROM HARDWARE RANDOM NUMBER GENERATORS

BACKGROUND

Technical Field

The present invention relates generally to information processing and, in particular, to producing volatile password hashing algorithm salts from hardware random number generators.

Description of the Related Art

Cryptographic password hashing algorithms are a key component in computer and Internet security and, thus, many variants exist, with each of the variants having various advantages and disadvantages. Of the variants, there are some that use salts (and are thus interchangeably referred to herein as "salt-based cryptographic password hashing algorithms). However, such salt-based cryptographic password hashing algorithms suffer from a number of deficiencies.

A crucial component to the success of such an algorithm is that the salts must stay constant for every authorization attempt and are, thus, maintained in plain text format in a database accessible by the authorizing machine. This means that the hashed (salted) passwords and the un-hashed salts have to be stored and are potentially accessible to a cracker.

If a cracker gets access to a database of hashed passwords, then the cracker can use brute force dictionary attack methods to crack a password. If the password was not salted, then the cracker can iterate through millions of words, and/or combinations of characters until the correct password is found. If the password was salted, even if the cracker tries the correct password, the cracker will also require the salt in order to be sure that the resulting password hash matches that from the database. Therefore, a cracker either has to get copies of the un-hashed salts or try to brute force an impossibly (with current computing power) large space of possible password-salt combinations. However, the fact that salts must be stored un-hashed in plain text format in databases accessible by the authorizing machine means that if a cracker gets copies of the hashed passwords, then it is plausible they cracker can also get copies of the un-hashed salts, which negates the advantages of using these salts.

Thus, there is a need for an improved approach for using salts in a salt-based cryptographic password hashing algorithm.

SUMMARY

According to an aspect of the present invention, a computer-implemented method is provided. The method includes generating, by a password management system using a set of Hardware Random Number Generators (HRNGs), at least one salt based on statistics of a set of random numbers with given distributions generated by the set of HRNGs. The method further includes forming, by a processor, a hashed password based on the at least one salt.

According to another aspect of the present invention, a computer program product is provided. The computer program product includes a non-transitory computer readable storage medium having program instructions embodied therewith. The program instructions are executable by a computer implementing a password management system to cause the computer to perform a method. The method includes generating, by the password management system using a set of Hardware Random Number Generators (HRNGs), at least one salt based on statistics of a set of random numbers with given distributions generated by the set of HRNGs. The method further includes forming, by a processor of the computer, a hashed password based on the at least one salt.

According to yet another aspect of the present invention, a password management system is provided. The password management system includes a set of Hardware Random Number Generators (HRNGs) for generating at least one salt based on statistics of a set of random numbers with given distributions generated by the set of HRNGs. The password management system further includes a processor for forming a hashed password based on the at least one salt.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to producing volatile password hashing algorithm salts from hardware random number generators.

In an embodiment, the present invention can provide a password management system that is capable of forming passwords using a novel salt-generation process and also of authorizing such passwords.

In an embodiment, the present invention is directed to cryptographic password hashing algorithms which include salts. In an embodiment, the present invention can involve a step in a cryptographic password hashing algorithm that allows multiple user's to have the same password, while maintaining different stored hashes and, thus, increasing security.

In an embodiment, the present invention employs Hardware Random Number Generators (HRNGs) that generate numbers with unique distributions which, in turn, permit unique statistics to be calculated of these distributions for each HRNG. These statistics can be used as salts in cryptographic password hashing algorithms, and do need to be recorded and accessed each time a password is checked. Instead, the statistics/salts can be recalculated whenever needed, thus overcoming the aforementioned deficiencies of prior art approaches to cryptographic password hashing algorithms that use salts.

Figure 1:
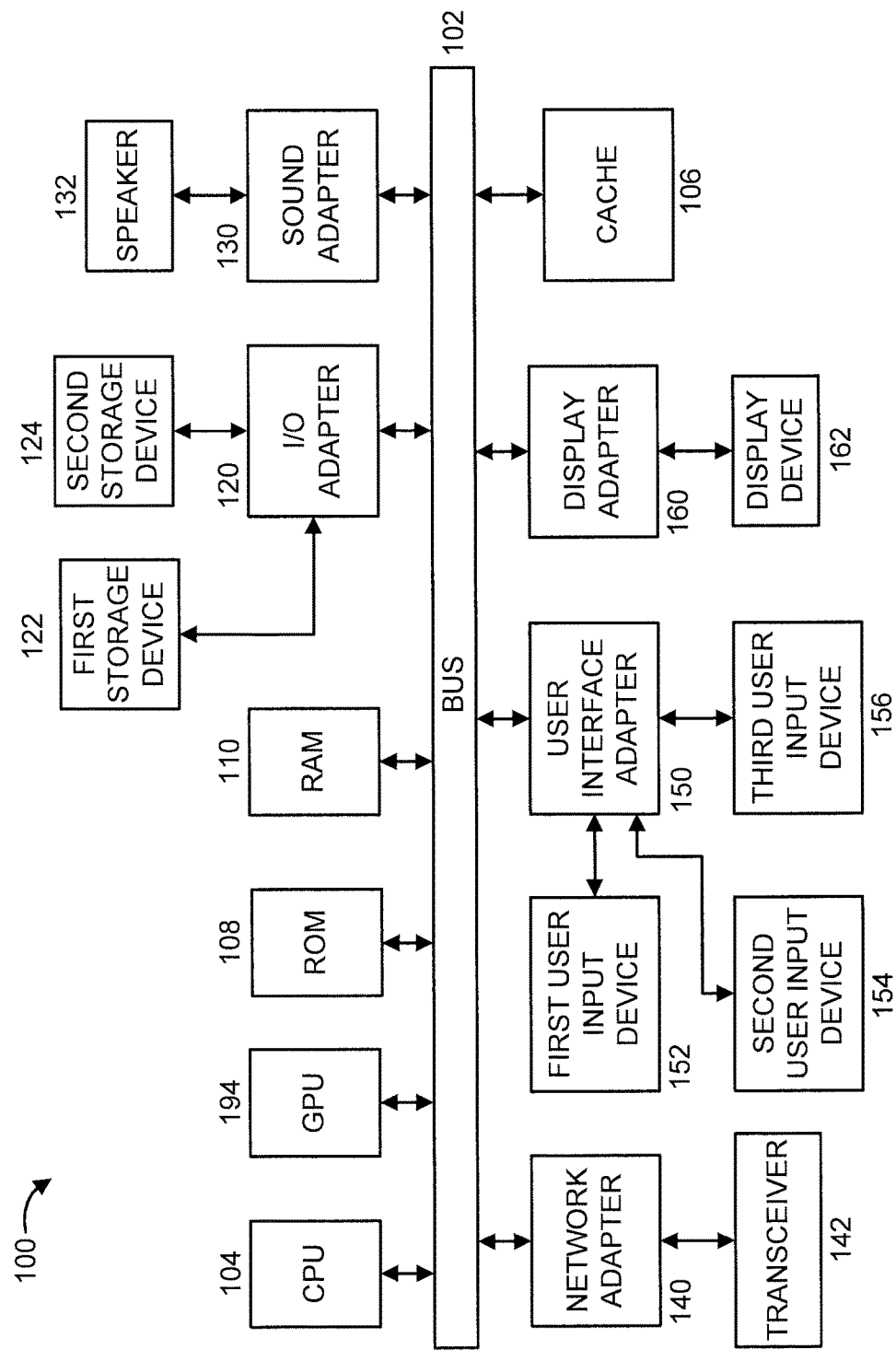
FIG. 1 is a block diagram showing an exemplary processing system to which the invention principles may be applied, in accordance with an embodiment of the present invention.

FIG. 1 is a block diagram showing an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
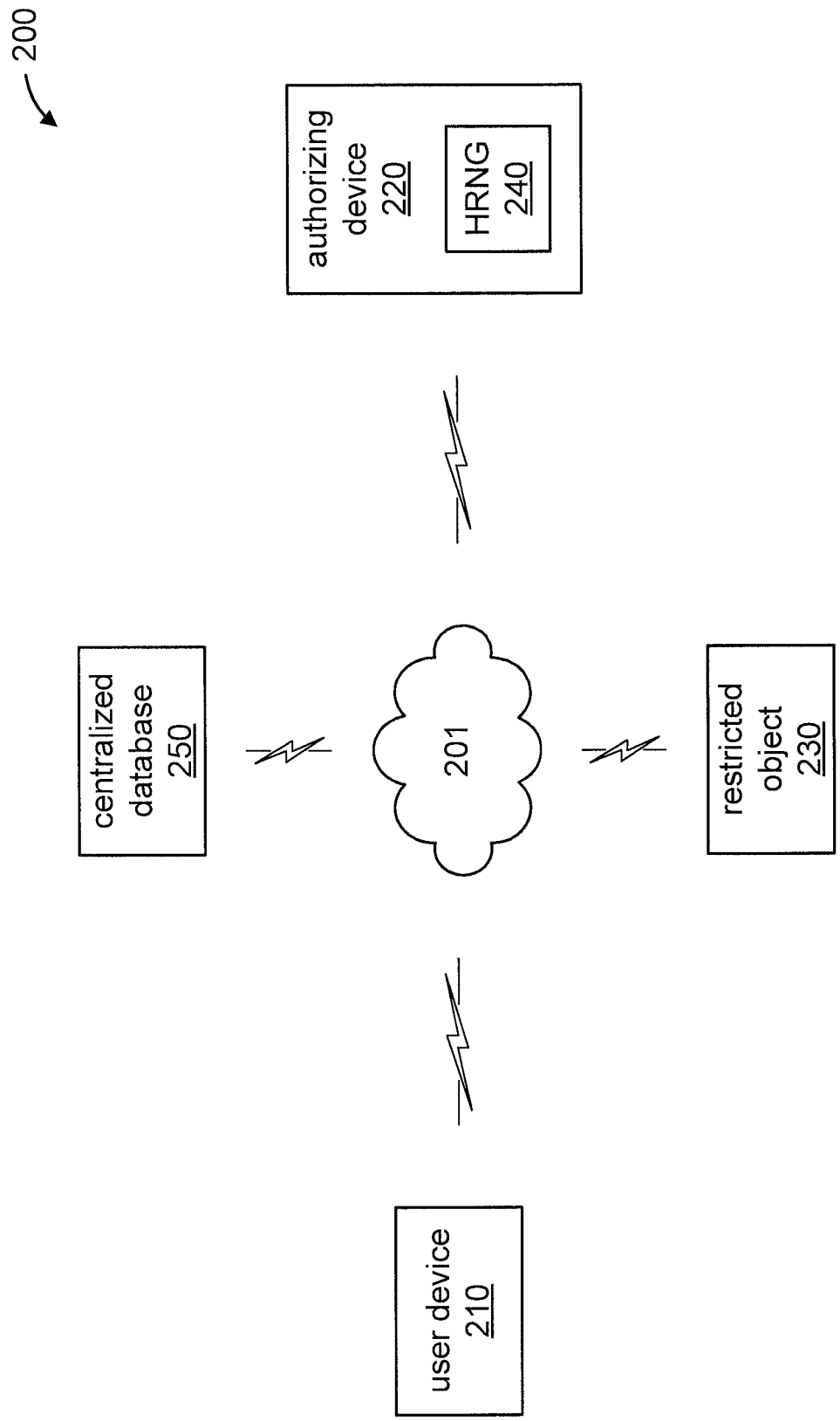
FIG. 2 is a block diagram showing an exemplary system for producing volatile password hashing algorithm salts from Hardware Random Number Generators HRNGs), in accordance with an embodiment of the present invention.
Figure 6:
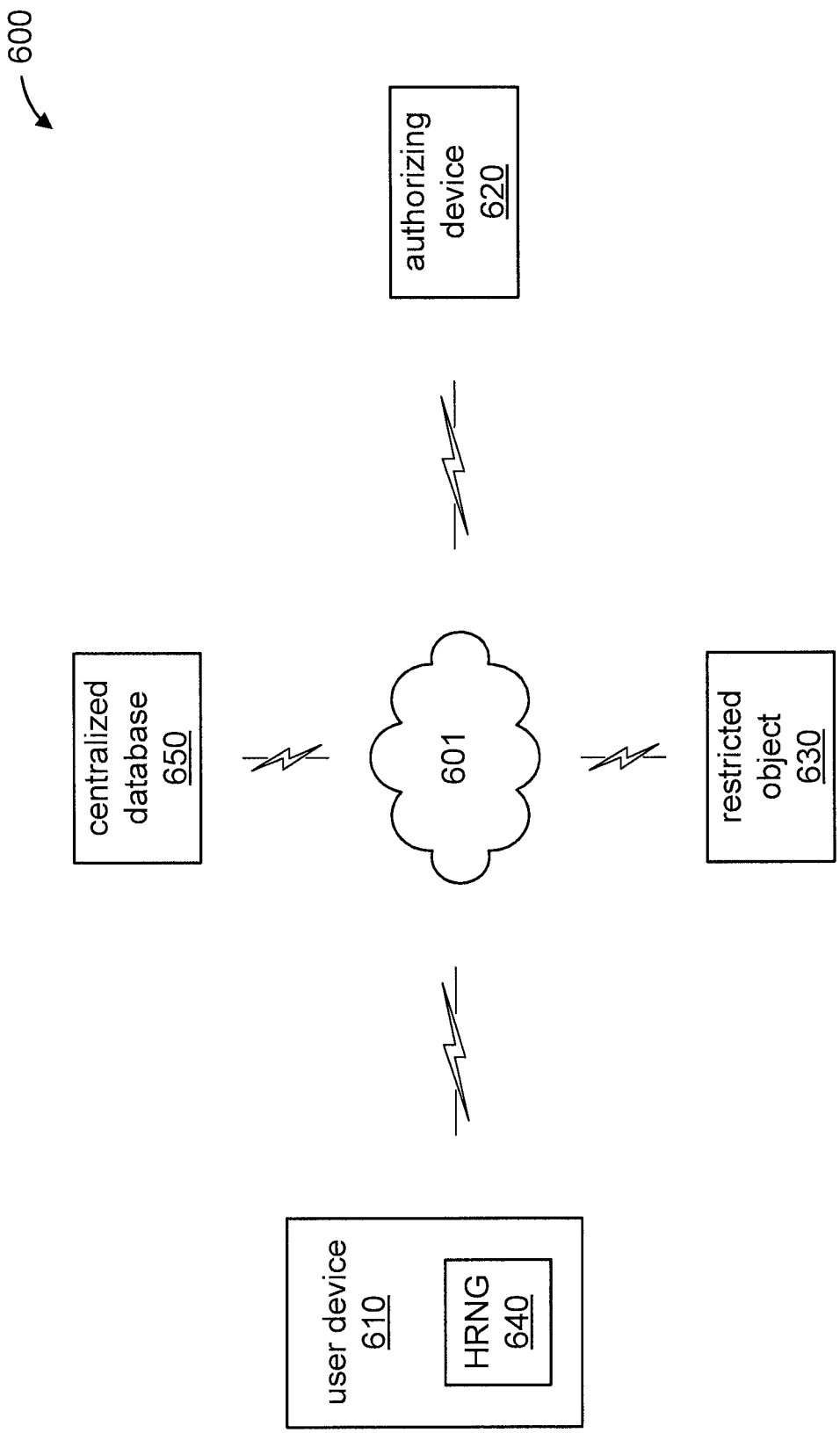
FIG. 6 is a block diagram showing another exemplary system for producing volatile password hashing algorithm salts from HRNGs, in accordance with an embodiment of the present invention.
Figure 7:
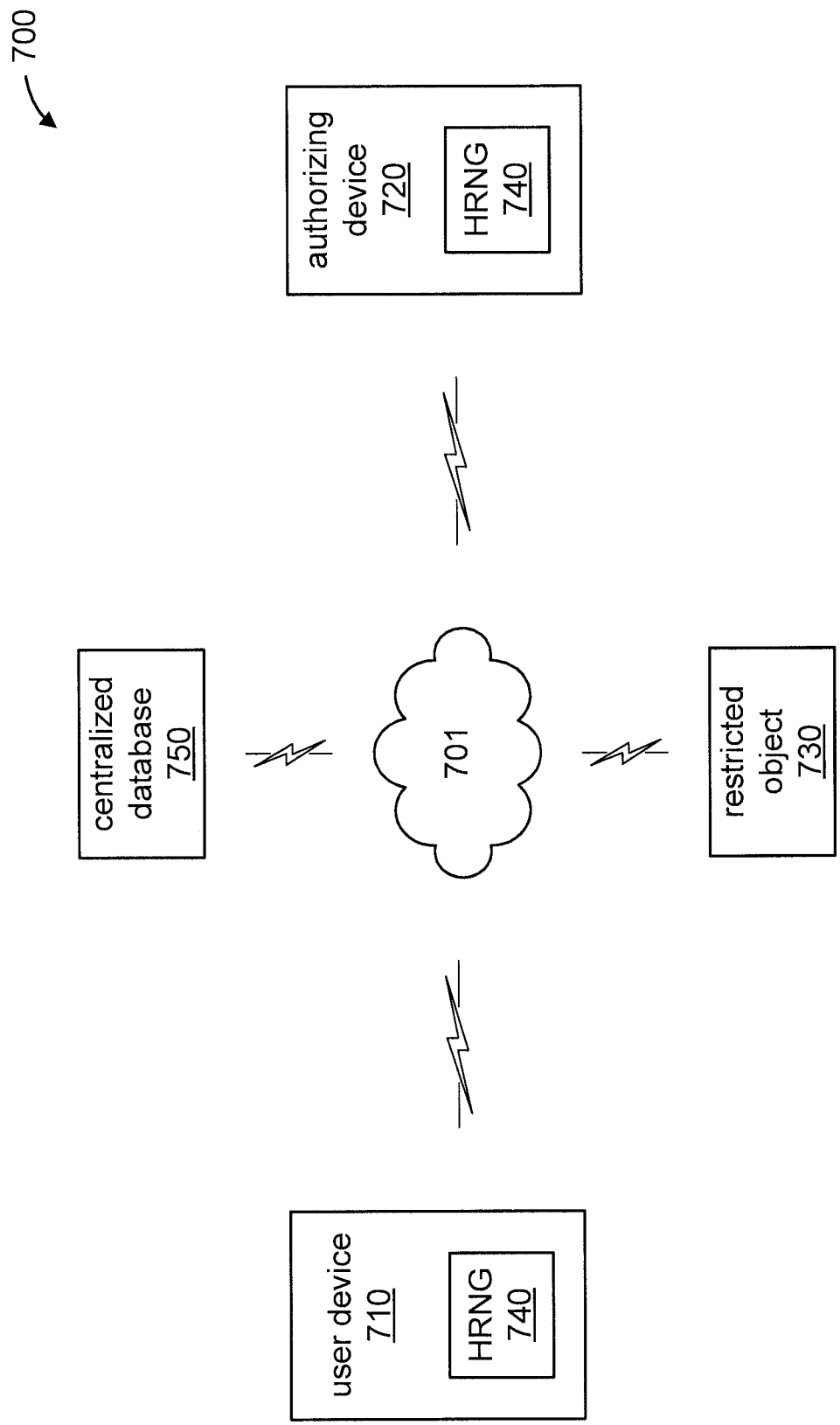
FIG. 7 is a block diagram showing yet another exemplary system for producing volatile password hashing algorithm salts from HRNGs, in accordance with an embodiment of the present invention.

Moreover, it is to be appreciated that systems 200, 600, and 700 described below with respect to FIGS. 2, 6, and 7, are respective systems for implementing respective embodiments of the present invention. Part or all of processing system 100 may be implemented in one or more of the elements of one or more of systems 200, 600, and 700.

Figure 4:
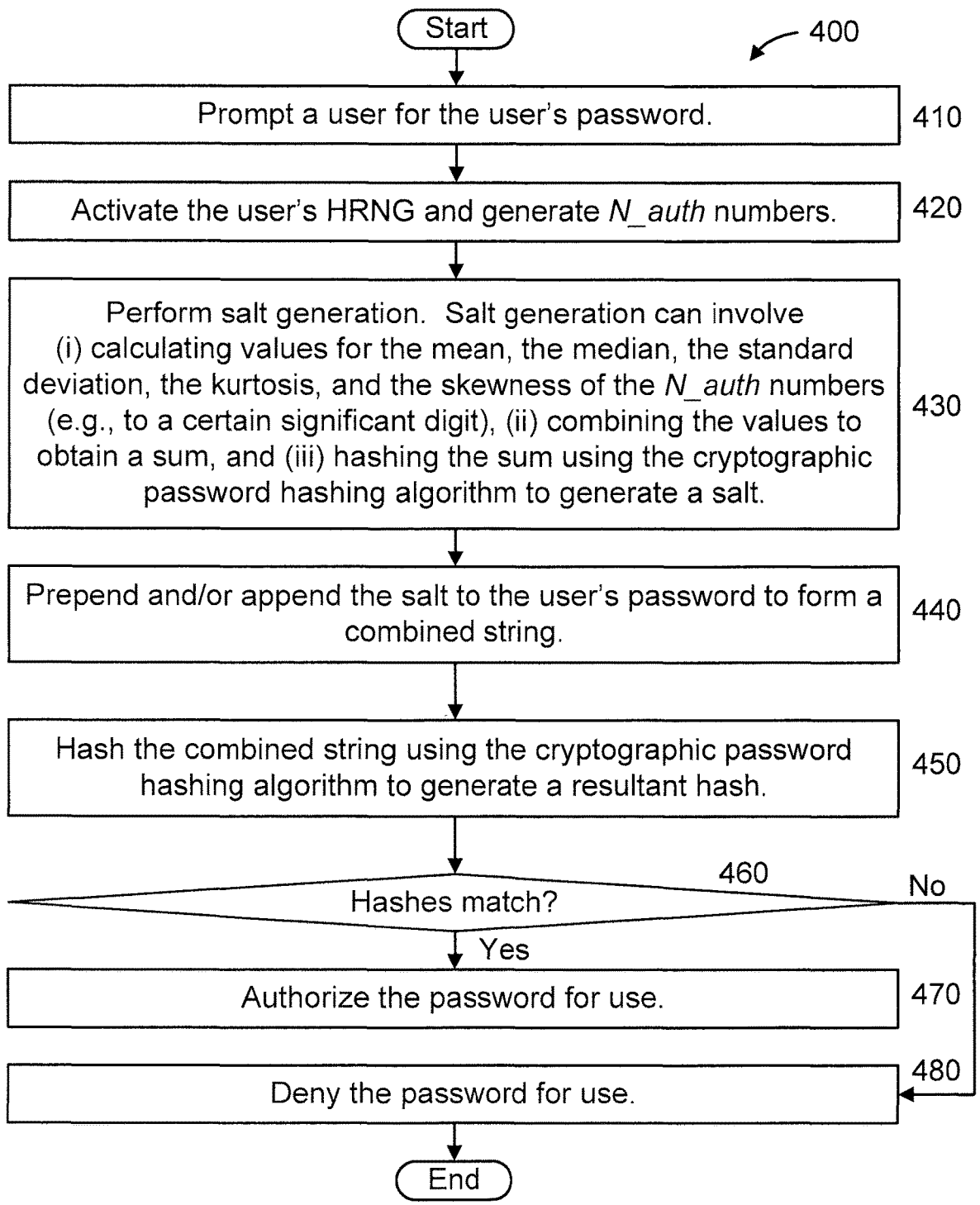
FIG. 4 is a flow diagram showing an exemplary method for authorizing a password, in accordance with an embodiment of the present invention.
Figure 5:
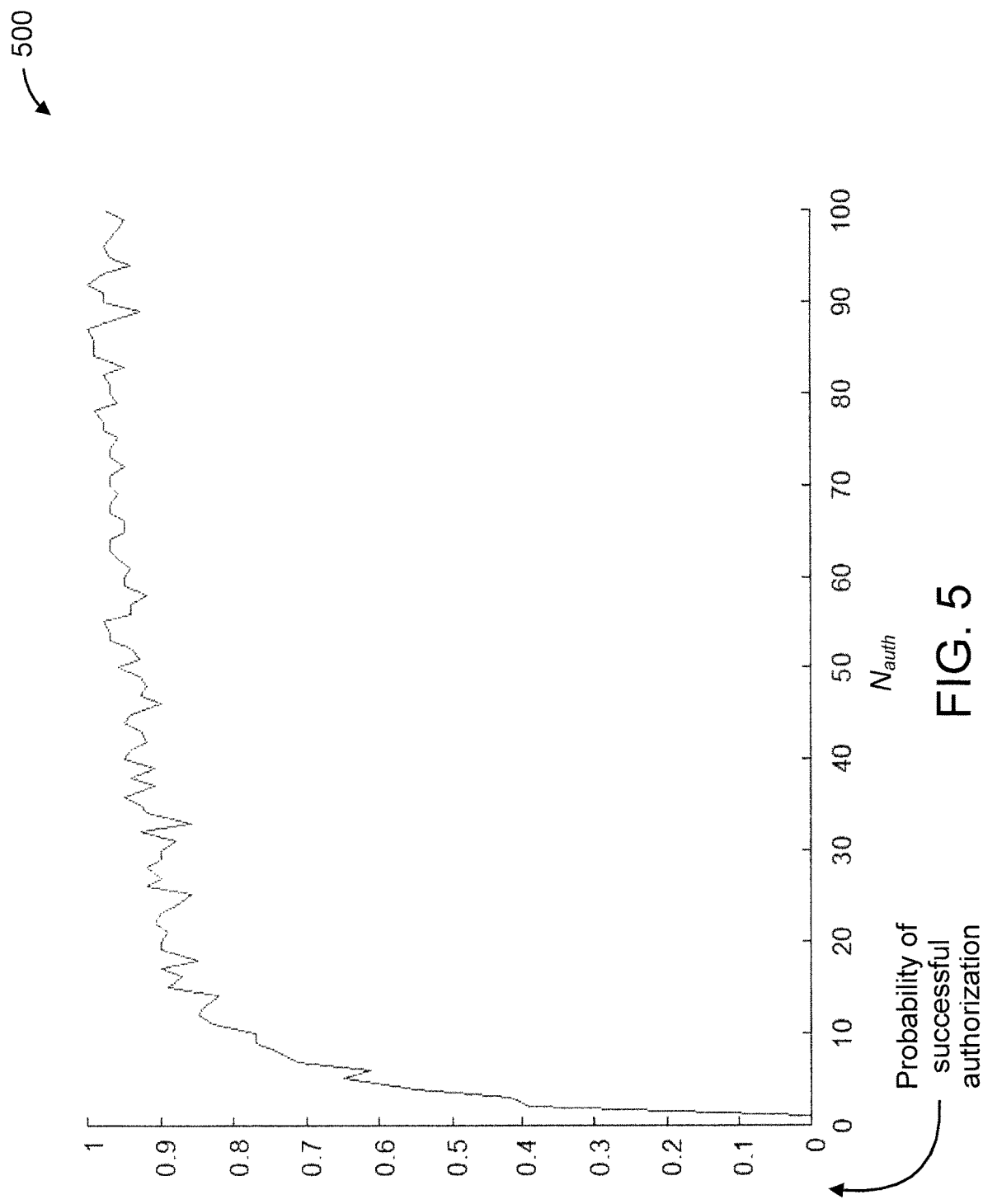
FIG. 5 is a plot showing an exemplary simulation, in accordance with an embodiment of the present invention.
Figure 8:
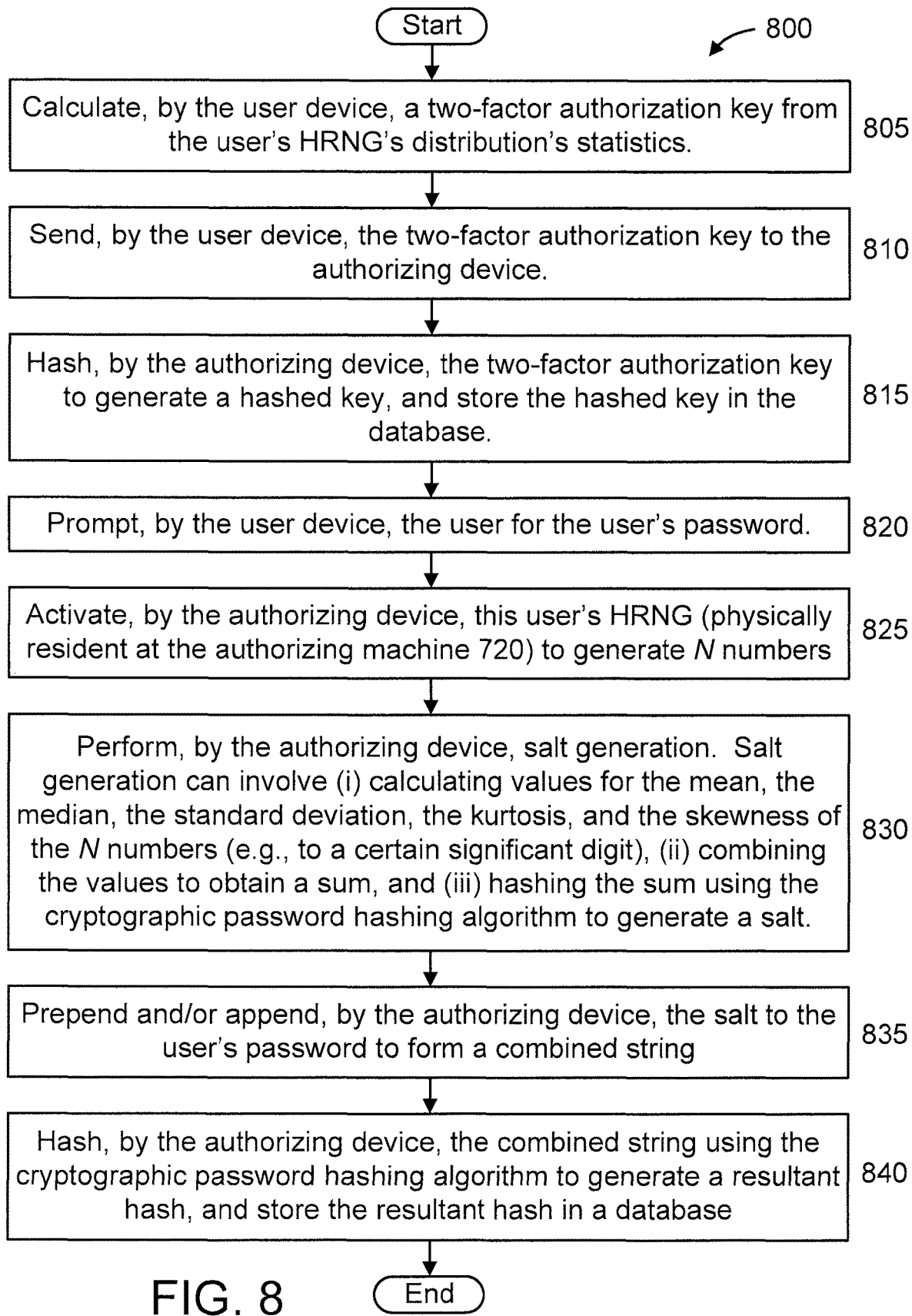
FIG. 8 is a flow diagram showing another exemplary method for adding a new password to a database, in accordance with an embodiment of the present invention.
Figure 9:
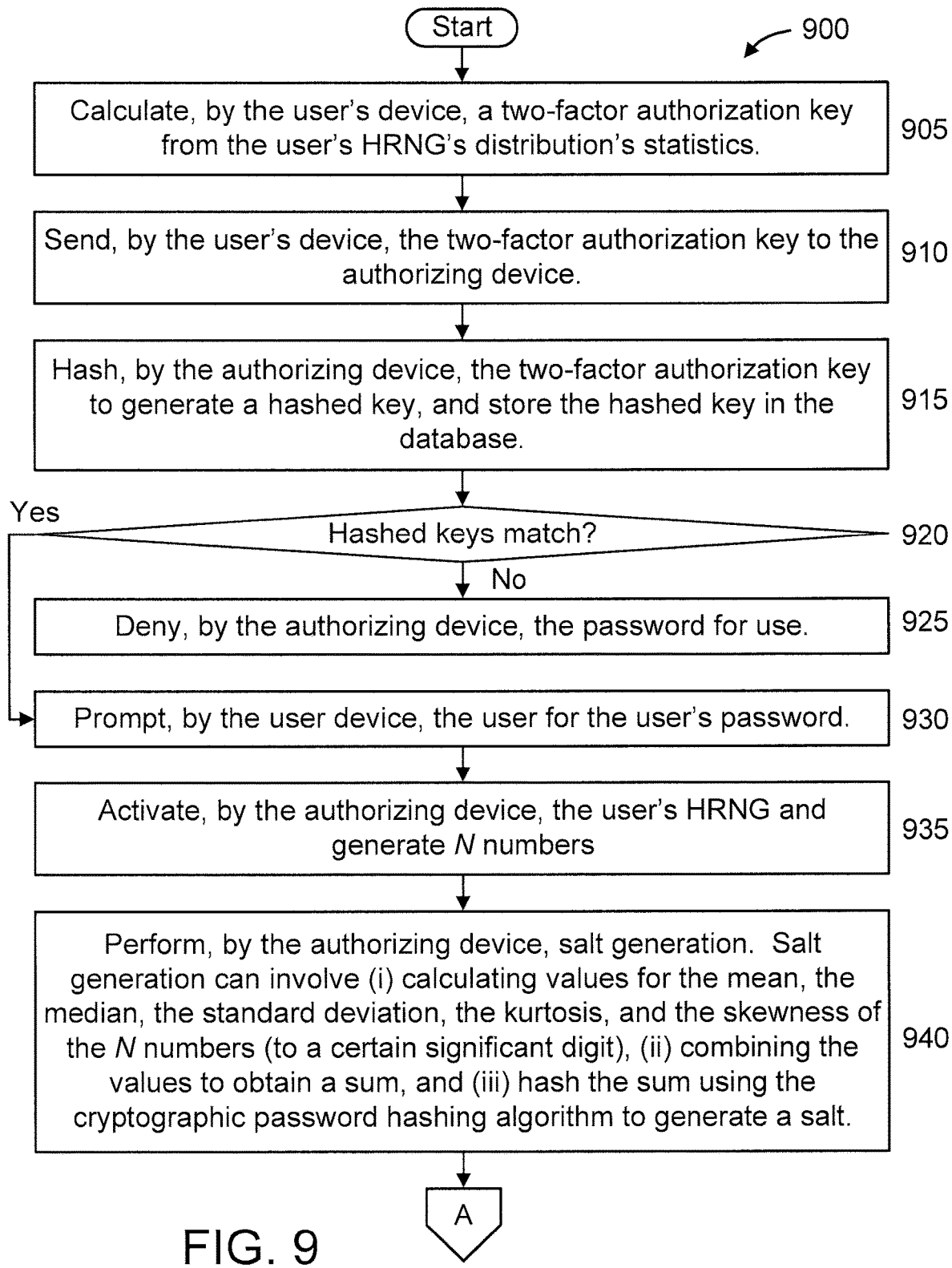
FIGS. 9-10 are flow diagrams showing another exemplary method for authorizing a password, in accordance with an embodiment of the present invention.
Figure 10:
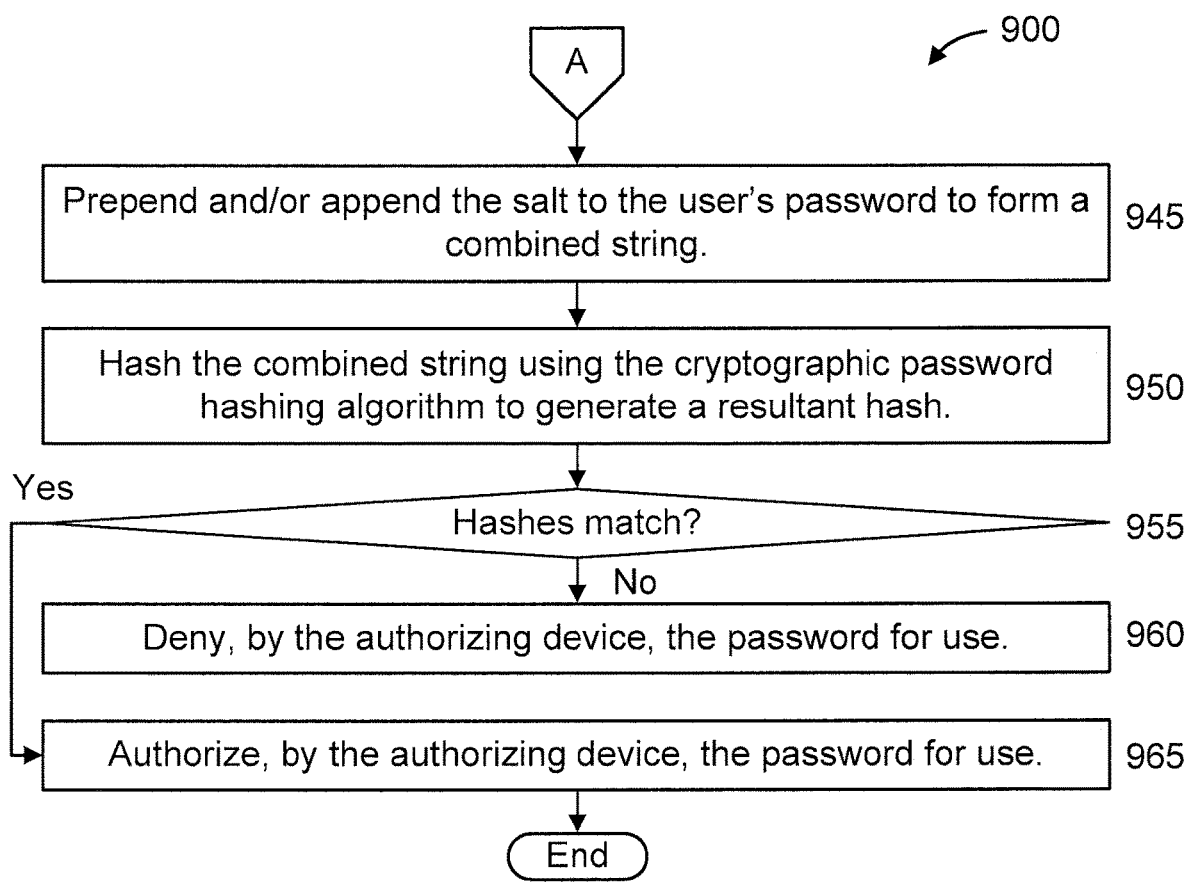

Further, it is to be appreciated that processing system 100 may perform at least part of the method described herein including, for example, at least part of method 400 of FIG. 4 and/or at least part of method 500 of FIG. 5 and/or at least part of method 800 of FIG. 8 and/or at least part of method 900 of FIGS. 9-10. Similarly, part or all of one or more of systems 200, 600 and 700 may be used to perform at least part of method 400 of FIG. 4 and/or at least part of method 500 of FIG. 5 and/or at least part of method 800 of FIG. 8 and/or at least part of method 900 of FIGS. 9-10.

As noted above, FIGS. 2, 6, and 7 respectively show systems 200, 600, and 700 that can each be used to implement one or more embodiments of the present invention.

In the embodiments shown in FIGS. 2, 6, and 7, the elements thereof are interconnected by a network(s) 201, 601, 701, respectively. However, in other embodiments, other types of connections can also be used. Moreover, in an embodiment, at least one of the elements of system 200, system 600, and system 700 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of system 200 and/or system 600 and/or and system 700 can be implemented in a cloud configuration including, for example, in a distributed configuration. Additionally, one or more elements in system 200 and/or system 600 and/or and system 700 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200, system 600, and system 700 are readily determined by one of ordinary skill in the art, given the teachings of the present invention provided herein, while maintaining the spirit of the present invention.

FIG. 2 is a block diagram showing an exemplary system 200 for producing volatile password hashing algorithm salts from Hardware Random Number Generators (HRNGs), in accordance with an embodiment of the present invention. System 200 relates to at least method 300 of FIG. 3 and method 400 of FIG. 4 described below. The elements of system 200, method 300, and method 400 can be considered to relate to an "initial embodiment".

System 200 includes a user device 210, an authorizing device 220, a restricted object 230, a Hardware Random Number Generator (HRNGs) 240, and a centralized database 250.

While one user device 210, one authorizing device 220, one restricted object 230, one HRNG 240, and one database 250 is shown and described relative to FIG. 2 for the sake of illustration, it is to be appreciated that other embodiments of the present invention can involve any number of user devices and/or authorizing devices and/or restricted objects and/or HRNGs and/or databases, as readily appreciated by one of ordinary skill in the art given the teachings of the present invention provided herein, while maintaining the spirit of the present invention.

The user device 210 is used to provide a password from a user, which is then authorized by the authorizing device 220. The user device 210, once authorized, can then access the restricted object 230.

The user device 210 can be any type of user device capable of communication with other elements of system 200 such as, for example, but not limited to, a computer, a laptop, a tablet, a media device, a smart phone, and so forth. It is to be appreciated that the preceding listing of user devices is merely illustrative and, thus, the present invention can involve other types of user devices, while maintaining the spirit of the present invention.

The authorizing device 220 can implemented by, e.g., a computer, a server, and/or so forth. These and other types of devices can be used for the authorizing device 220, while maintaining the spirit of the present invention. While described as a device, the authorizing device 220 can be considered to be the entirety or part of a password authorizing system.

The restricted object 230 can be any type of object that can be accessed using a user device 210 such as, for example, but not limited to, a web page, a web site, a database (e.g., other than centralized database 250), another system, a room, a facility, and so forth. It is to be appreciated that the preceding listing of restricted objects is merely illustrative and, thus, other types of objects can also be used, while maintaining the spirit of the present invention.

The HRNG 240 is used to generate random numbers for both the user device 210 and the authorizing device 220. In an embodiment, each user has its own HRNG. For example, in an embodiment, both the user device 210 and the authorizing device 220 can access a respective HRNG 240 resident on the authorizing device 220 and dedicated to a particular user.

The centralized database 250 is used to store hashed user passwords.

Figure 3:
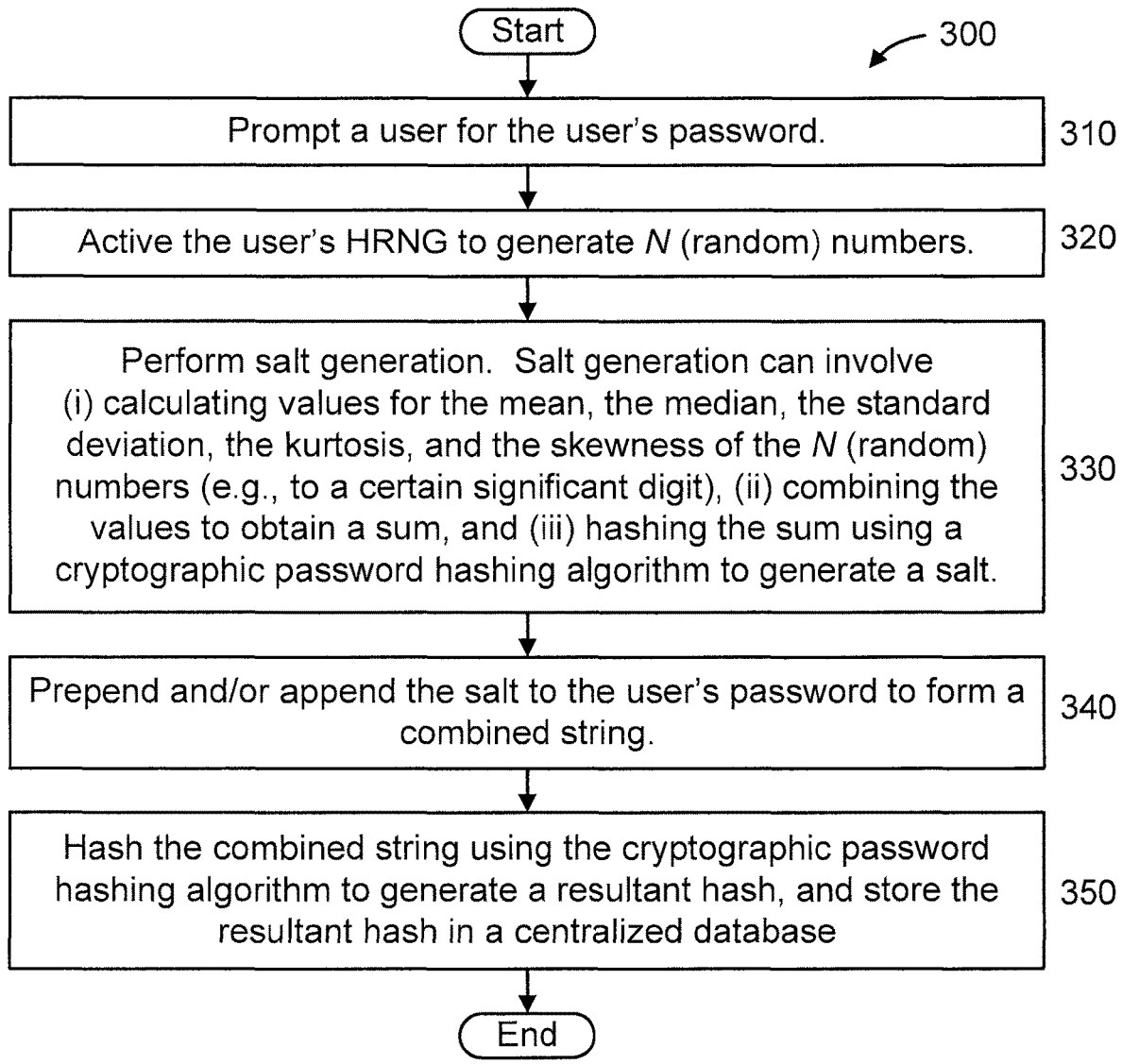
FIG. 3 is a flow diagram showing an exemplary method for adding a new password to a database, in accordance with an embodiment of the present invention.

FIG. 3 is a flow diagram showing an exemplary method 300 for adding a new password to a database, in accordance with an embodiment of the present invention. The database can be, for example, database 250 of FIG. 2.

At block 310, prompt a user for the user's password (potentially twice).

At block 320, active the user's HRNG to generate N (random) numbers.

At block 330, perform salt generation. In an embodiment, salt generation can involve (i) calculating values for the mean, the median, the standard deviation, the kurtosis, and the skewness of the N (random) numbers (e.g., to a certain significant digit), (ii) combining the values to obtain a sum, and (iii) hashing the sum using a cryptographic password hashing algorithm to generate a salt.

At block 340, prepend and/or append the salt to the user's password to form a combined string.

At block 350, hash the combined string using the cryptographic password hashing algorithm to generate a resultant hash, and store the resultant hash in a centralized database (for future use). In an embodiment, the centralized database can be centralized database 250 of system 200 of FIG. 2.

FIG. 4 is a flow diagram showing an exemplary method 400 for authorizing a password, in accordance with an embodiment of the present invention.

At block 410, prompt a user for the user's password.

At block 420, activate the user's HRNG and generate N_auth numbers. It is to be appreciated that each of the N_auth numbers is a random number.

At block 430, perform salt generation. In an embodiment, salt generation can involve (i) calculating values for the mean, the median, the standard deviation, the kurtosis, and the skewness of the N_auth numbers (e.g., to a certain significant digit), (ii) combining the values to obtain a sum, and (iii) hashing the sum using the cryptographic password hashing algorithm to generate a salt.

At block 440, prepend and/or append the salt to the user's password to form a combined string.

At block 450, hash the combined string using the cryptographic password hashing algorithm to generate a resultant hash.

At block 460, compare the resultant hash generated at block 450 with the resultant hash generated at block 350 of method 300 (and stored in centralized database 250) to determine if they match. If so, then proceed to block 470. Otherwise, proceed to block 480.

At block 470, authorize the password for use.

At block 480, deny the password for use.

Thus, the present invention advantageously avoids above-described vulnerability by not requiring the permanent storage of salts. Instead, salts are produced from Hardware Random Number Generators (HRNGs). HRNGs produce pseudo-random numbers similar to random number generator algorithms. However, HRNGs are typically separate devices which connect to a computer, potentially via a USB socket (or other type of connection), and produce numbers continuously at a given rate in a stream. HRNGs generate their random numbers from different sources some of which can include, for example, but are not limited to: shot noise; Johnson-Nyquist noise; flicker noise; quantization noise; beam splitter noise; and avalanche diodes. Typically, HRNGs are designed to generate numbers from a uniform distribution. However, in an embodiment of the present invention, each user will have a unique HRNG device (in an initial embodiment described with respect to FIGS. 2, 3, and 4, the HRNG is physically located and connected with the authorizing device 220) producing random numbers from unique, different, but set, distributions. Since each device generates numbers from different distributions, the possible combination of statistics that can be calculated from many HRNGs is very large. Therefore, the system calculates statistics such as the mean, median, standard deviation, kurtosis, and skewness, hashes these values, and uses the result as salts in a cryptographic password hashing algorithm. The statistics can be calculated at any time given enough numbers from the HRNG, so they do not need to be stored on the authorizing machine (although if a fail-safe mechanism is required in case of HRNG failure, they could be stored encrypted on a physically separate, and non-networked, machine, requiring a person to physically retrieve the salts).

An important consideration in the proposed HRNG-based system is N_auth: the number of required generated numbers during an authorization attempt. When adding a password, the disclosed system could use N_add=100,000,000 generated numbers to produce the initial salts accurately. To produce this large sequence of numbers may take a long time, so during subsequent authorization attempts, a smaller set of generated numbers can be used to recalculate the salt.

However, when calculating the mean, median, standard deviation, kurtosis, and skewness, if too few numbers are generated, then these statistics could be incorrect such that the resulting salts will also be incorrect. Therefore, even if a user enters their password correctly, the system will deny access. However, as N_auth increases, the probability of this decreases. FIG. 5 is a plot showing an exemplary simulation 500, in accordance with an embodiment of the present invention. In the plot, the x-axis denotes N_auth, and the y-axis denotes the probability of a successful authorization. Hence, in the simulation 500, the mean of one hundred authorization attempts with statistics calculated to five significant digits with increasing N_auth (x1×10^6) versus the probability of a single authorization attempt being successful, is shown For sufficiently large N_auth, the probability of multiple successive false failed authorizations is very low (p~=0.000125 for 3 consecutive false failed authorizations).

A description will now be given regarding various advantages of the present invention over prior art approaches, according to various embodiments of the present invention.

One advantage is that the salts used in accordance with the present invention are not stored in the database, but instead recalculated at every authorization instance. This negates the possibility that a cracker can acquire copies of the un-hashed salts.

Another advantage is that since the salt has to be calculated from larger sets of numbers (to reduce the probability of a false failed authorization, see, e.g., FIG. 4), having a HRNG with a low output rate introduces a delay in the authorization process. This delay hinders a crackers ability to perform a remote dictionary attack, as each attempt requires this delay, and this reduces the rate at which a cracker can test many passwords. (Delays are sometimes implemented into an authorizing system's algorithm for this very reason, however are not required, and thus can be negated if a cracker adjusts the algorithm's implementation. In accordance with the present invention, the delay cannot be negated as the large set of generated numbers is a requirement for correct authorization.

Yet another advantage is that given a large set of generated random numbers, there always remains a small probability that the system will produce a false failed authorization in the disclosed method and system. This small probability will not impact the user's experience too much as it is very low (p~=0.05 for sufficient N_auth), however the small probability does introduce uncertainty to a cracker's dictionary attack or brute force. Essentially, a random 5% of their authorization attempts are false failed authorizations, which means that they cannot be certain that trying a password and failing an authorization attempt is true. They must therefore try each password multiple times until they are satisfied that the probability of n consecutive failed authorization attempts is too low.

Still another advantage is key strengthening (or key stretching), which is a method to increase the algorithmic time to go from plain text to hash. Basically, it involves iterating over the same hash (plus the original password and salt) many times before reaching the final hash. This increases the time required to verify one password with a hash, and therefore drastically increases the time required for a brute force dictionary attack.

A description will now be given regarding another embodiment of the present invention (hereinafter "additional embodiment 1").

In additional embodiment 1, the same system is disclosed but the HRNG is physically located and stored with the user. The workflow is exactly the same as the initial embodiment (e.g., see FIGS. 2, 3, and 4) except that the HRNG generates numbers and the statistics are calculated on the user's machine instead of the authorizing system's machine.

FIG. 6 is a block diagram showing another exemplary system 600 for producing volatile password hashing algorithm salts from Hardware Random Number Generators (HRNGs), in accordance with an embodiment of the present invention. System 600 can relate to additional embodiment 1, in accordance with an embodiment of the present invention. System 600 can relate to at least method 300 of FIG. 3 and method 400 of FIG. 4 described below, with the caveat that each user's HRNGs is resident on that user's device (instead of being resident on the authorization device).

System 600 includes a user device 610, an authorizing device 620, a restricted object 630, a Hardware Random Number Generators (HRNG) 640, and a centralized database 650.

System 600 is similar to system 200 with the exception of the location of the HRNGs. In particular, each user device 610 can include its own HRNG 630 (that is also used by the authorizing device 620), while each user device 210 in FIG. 2 relied upon and used the HRNG 230 resident on the authorization device 220.

Also similar to FIG. 2, the numbers of each of the elements in FIG. 6 have been selected for the sake of illustration and, thus, different numbers of elements can be used in other embodiments, while maintaining the spirit of the present invention.

A description will now be given regarding advantages provided by additional embodiment 1 over the prior art.

This additional embodiment has the same advantages as the initial disclosed embodiment (system (FIG. 2) and method (FIGS. 3 and 4)).

Moreover, this additional embodiment has the additional advantage that passwords can only be authorized if the user has their HRNG. This eliminates the risk of a cracker remotely accessing the HRNG, when physically stored with the authorizing machine (and potentially other users' HRNGs as well), and calculating and storing their own copies of the HRNG's distribution's statistics.

A description will now be given regarding yet another embodiment of the present invention (hereinafter "additional embodiment 2").

In additional embodiment 2, a system with two HRNGs could increase security with two-factor authorization. Two HRNGs, one for the user device and one for the authorizing machine, allows a two way check whereby both the authorizing machine and a user's device check with each other if they are satisfied during an authorization attempt. This has the advantage that passwords can only be authorized if the user has their own HRNG, similar to additional embodiment 1. Furthermore, it requires that the authorizing machine is satisfied that the user is the "correct user".

FIG. 7 is a block diagram showing yet another exemplary system 700 for producing volatile password hashing algorithm salts from Hardware Random Number Generators (HRNGs), in accordance with an embodiment of the present invention. System 700 can relate to additional embodiment 2, in accordance with an embodiment of the present invention.

System 700 includes a user device 710, an authorizing device 720, a restricted object 730, a set of Hardware Random Number Generators (HRNGs) 740, and a centralized database 750.

System 700 is similar to system 200 with the exception of the location of the HRNGs. In particular, system 700 involves two HRNGs (i.e., a pair of HRNGs) associated with each user device 710, with one HRNG from the pair resident at and used by the user device 710 and the other HRNG from the pair resident at and used by the authorizing device 720, while in system 200 both the user device 210 and the authorizing device 220 used the same HRNG which is resident on the authorization device 220.

FIG. 8 is a flow diagram showing another exemplary method 800 for adding a new password to a database, in accordance with an embodiment of the present invention. The database can be, for example, database 750 of FIG. 7.

At block 805, calculate, by the user device, a two-factor authorization key from the user's HRNG's distribution's statistics.

At block 810, send, by the user device, the two-factor authorization key to the authorizing device.

At block 815, hash, by the authorizing device, the two-factor authorization key to generate a hashed key, and store the hashed key in the database.

At block 820, prompt, by the user device, the user for the user's password (potentially twice).

At block 825, activate, by the authorizing device, this user's HRNG (physically resident at the authorizing machine 720) to generate N numbers (see FIG. 5).

At block 830, perform, by the authorizing device, salt generation. In an embodiment, salt generation can involve (i) calculating values for the mean, the median, the standard deviation, the kurtosis, and the skewness of the N numbers (e.g., to a certain significant digit), (ii) combining the values to obtain a sum, and (iii) hashing the sum using the cryptographic password hashing algorithm to generate a salt.

At block 835, prepend and/or append, by the authorizing device, the salt to the user's password to form a combined string.

At block 840, hash, by the authorizing device, the combined string using the cryptographic password hashing algorithm to generate a resultant hash, and store the resultant hash in a database (for future use). In an embodiment, the database can be database 750 of system 700 of FIG. 7.

FIGS. 9-10 are flow diagrams showing another exemplary method 900 for authorizing a password, in accordance with an embodiment of the present invention.

At block 905, calculate, by the user's device, a two-factor authorization key from the user's HRNG's distribution's statistics.

At block 910, send, by the user's device, the two-factor authorization key to the authorizing device.

At block 915, hash, by the authorizing device, the two-factor authorization key to generate a hashed key, and store the hashed key in the database.

At block 920, compare, by the authorizing device, the hashed key generated at 915 with the hashed key generated at block 840 of method 800 (and stored in database 750) to determine if they match. If so, then proceed to block 930. Otherwise, proceed to block 925.

At block 925, deny, by the authorizing device, the password for use.

At block 930, prompt, by the user device, the user for the user's password.

At block 935, activate, by the authorizing device, the user's HRNG and generate N numbers (see, e.g., FIG. 5).

At block 940, perform, by the authorizing device, salt generation. In an embodiment, salt generation can involve (i) calculating values for the mean, the median, the standard deviation, the kurtosis, and the skewness of the N numbers (to a certain significant digit), (ii) combining the values to obtain a sum, and (iii) hash the sum using the cryptographic password hashing algorithm to generate a salt.

At block 945, prepend and/or append the salt to the user's password to form a combined string.

At block 950, hash the combined string using the cryptographic password hashing algorithm to generate a resultant hash.

At block 955, compare, by the authorizing device, the resultant hash generated at block 950 with the resultant hash generated at block 840 of method 800 (and stored in database 750) to determine if they match. If so, then proceed to block 960. Otherwise, proceed to block 965.

At block 960, authorize, by the authorizing device, the password for use.

At block 965, deny, by the authorizing device, the password for use.

A description will now be given regarding advantages provided by additional embodiment 2 over the prior art.

This additional embodiment has the combined advantages of the initial disclosed embodiment and additional embodiment 1.

Moreover, this additional embodiment has the same typical advantages of two-factor authorization methods and systems including, for example, having a user prove they are the correct user before even attempting an authorization attempt. Therefore, even if a cracker knows your password, they cannot be authorized without the two-factor authorization satisfied as well.

A description will now be given regarding still another embodiment of the present invention (hereinafter "additional embodiment 3").

In additional embodiment 3, as an extension to additional embodiment 1, the same system is disclosed but the HRNG produces numbers from a distribution dependent on some element of their surroundings. For example, the time of the day, the weather, their physical location within the world or a building, or the user's biometric information. With this additional requirement, a user can only attempt to get authorized if the numbers are generated according to their location, time of day, weather, with their fingerprint, and/or so forth. This limits users, for example, to authorizing between 5 pm and 6 pm, or only when it is cloudy, or only when they are at work, and/or so forth. In an embodiment, these parameters can be setup by the user when storing their password or can be controlled by an administrator of the authorizing system. The source of this distribution dependence, the source of noise for the HRNG could be dependent on the time of the day (amount of light) or location (with a bias from a GPS source).

A description will now be given regarding advantages provided by additional embodiment 3 over the prior art.

This additional embodiment has the combined advantages of the main disclosed method and system and additional embodiment 1

Moreover, this additional embodiment has the additional advantage that even if a cracker gets access to the stream of numbers from the HRNG (i.e., they either have direct access to the user's HRNG or have access to the stream of numbers generated from it) they must be in the correct location, and/or it must be the correct time of day, and/or it must be the correct weather, and/or so forth.

A description will now be given regarding another embodiment of the present invention (hereinafter "additional embodiment 4").

Additional embodiment 4 involves the combination of the initial embodiment and additional embodiment 2 (and therefore additional embodiment 1 as well) and additional embodiment 3. This additional embodiment, thus, has two-factor authorization with position/weather/time/etc. dependent numbers generated by both the authorizing machine's HRNG and the user's HRNG. Therefore, a user can only login, for example, (1) when at home, in the evening and if they have their HRNG, and (2) if the authorizing machine's HRNG is in the correct building at the correct time. The cracker, thus, needs to also be physically located in the same place even if they get physical access to the user's HRNG, or if they intercept the user's HRNG's stream of random numbers they must do so at the correct time of day. The same applies for the authorizing device's HRNG.

A description will now be given regarding advantages provided by additional embodiment 4 over the prior art.

This additional embodiment has the combined advantages of the initial embodiment as well as additional embodiments 2 and 3.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
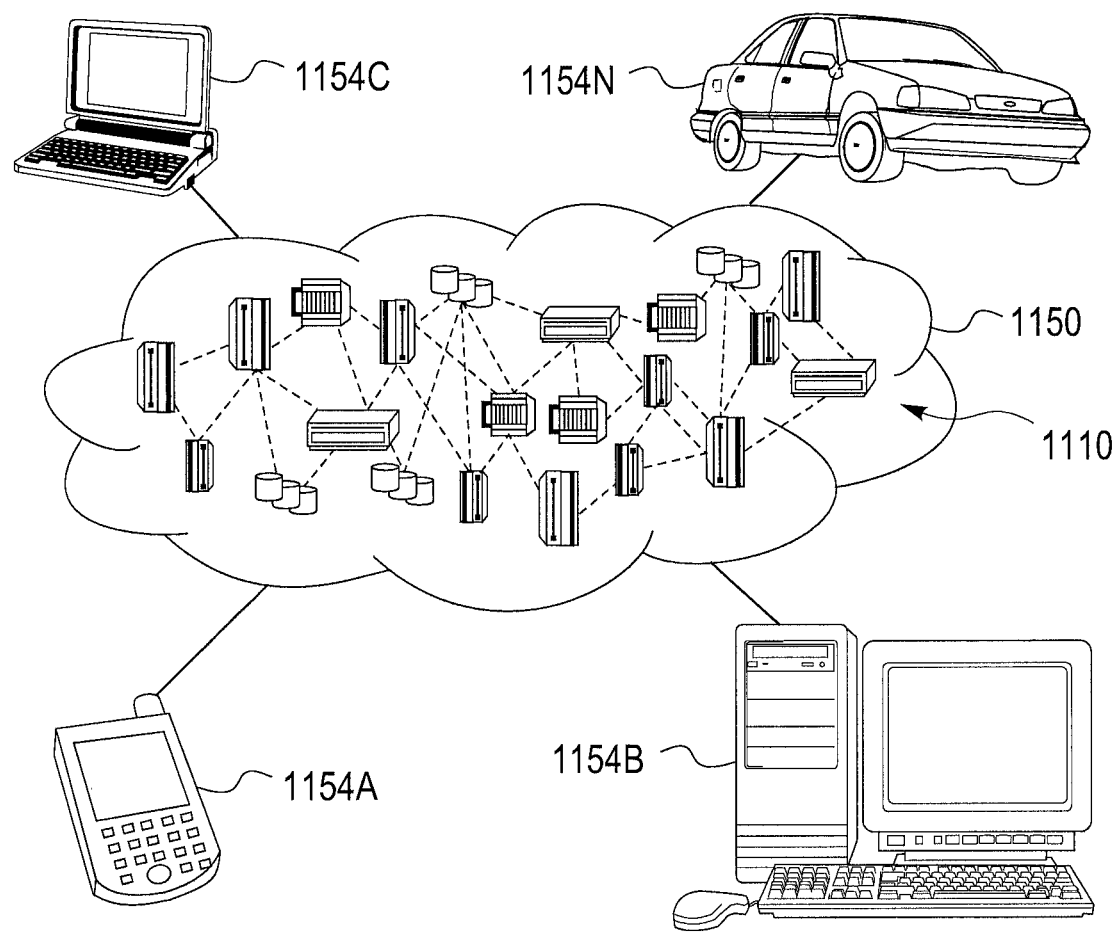
FIG. 11 is a block diagram showing an illustrative cloud computing environment having one or more cloud computing nodes with which local computing devices used by cloud consumers communicate in accordance with one embodiment.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
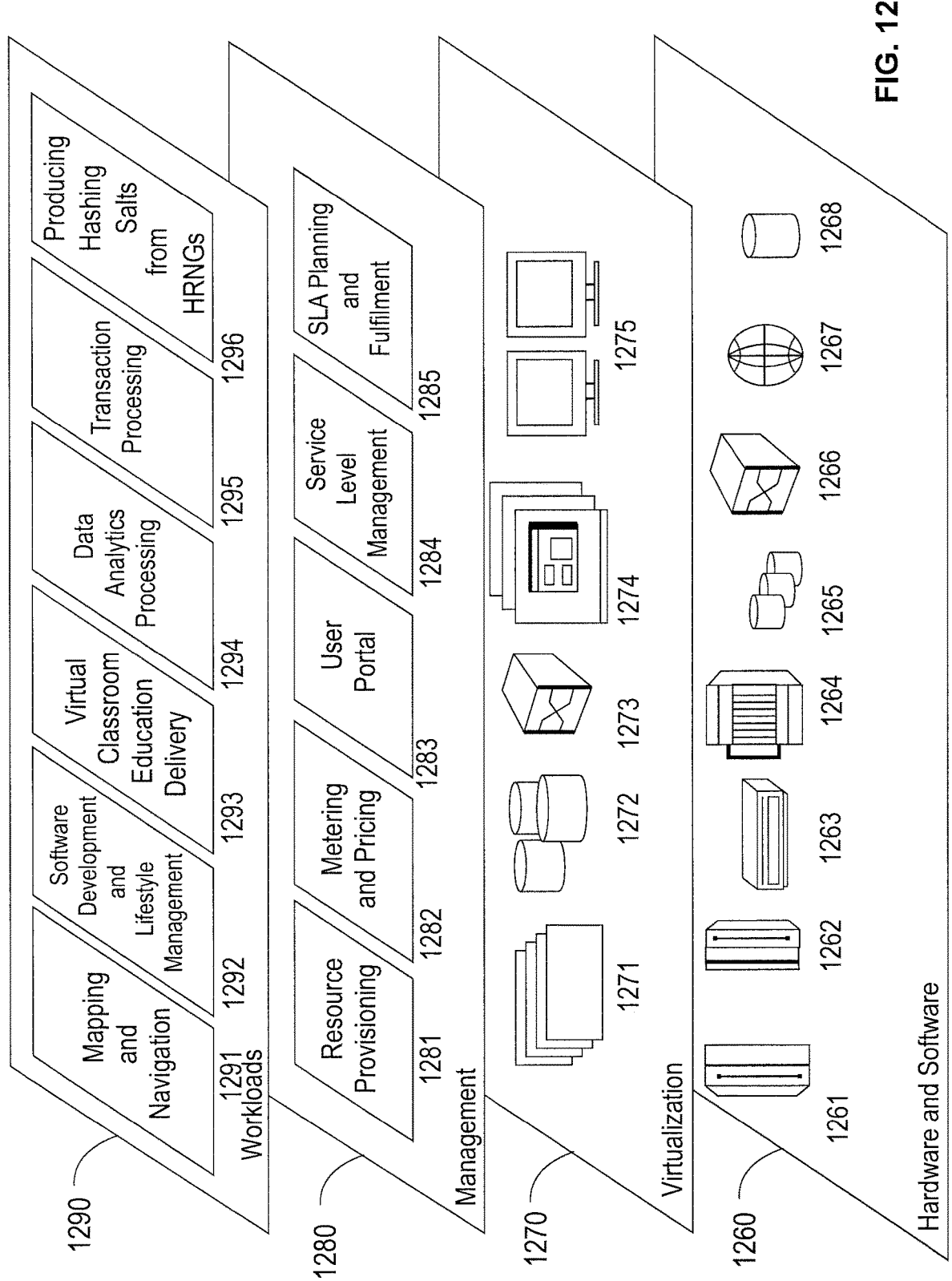
FIG. 12 is a block diagram showing a set of functional abstraction layers provided by a cloud computing environment in accordance with one embodiment.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and producing volatile password hashing algorithm salts from Hardware Random Number Generators (HRNGs) 1296.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method, comprising:
generating, by a password management system using a set of Hardware Random Number Generators (HRNGs), at least one salt based on statistics of a set of random numbers with given unique distributions generated by the set of HRNGs;
forming, by a processor, a hashed password based on the at least one salt; and
configuring different internally determined distributions to be randomly determined at a production time;
wherein a subsequent forming of the hashed password comprises recalculating, using the HRNGs, the given unique distributions to generate the at least one salt in place of recording the at least one salt, and
wherein, for each of a plurality of users, a different pair of HRNGs from the set are used for password authorizing, one of the HRNGs from the different pair being physically located at and connected to an authorizing device of the password managing system and another one of the HRNGs from the different pair being physically located at and connected to a respective one of a plurality of user devices.

2. The computer-implemented method of claim 1, wherein a respective different HRNG from the set is used for each of a plurality of user devices.

3. The computer-implemented method of claim 1, wherein the set of HRNGs is physically located at and operatively coupled to an authorizing device of the password management system that is configured to authorize passwords of users.

4. The computer-implemented method of claim 1, wherein a respective different HRNG from the set is physically located at and connected to each of a plurality of user devices.

5. The computer-implemented method of claim 1, wherein the HRNGs in the set each generate the random numbers from different internally determined distributions.

6. The computer-implemented method of claim 5, further comprising: configuring the different internally determined distributions to be adjustable by an administrator of the password management system.

7. The computer-implemented method of claim 5, further comprising: determining the different internally determined distributions based on a parameter selected from the group consisting of a HRNG location, an ambient air temperature, a time of day, a date, a weather condition, and a user biometric.

8. The computer-implemented method of claim 1, wherein the statistics comprise a set of metrics selected from the group consisting of a mean, a median, a standard deviation, a kurtosis, and a skewness of the set of random numbered generated by the HRNGs.

9. The computer-implemented method of claim 1, wherein the at least one salt is generated by hashing the statistics.

10. The computer-implemented method of claim 1, wherein the at least one salt is used by a password hashing algorithm and authorizing device of the password management system.

11. The computer-implemented method of claim 1, further comprising:
   storing the at least one salt on a non-networked storage medium which is physically separated from an authorizing device; and
   retrieving the at least one salt from the non-networked storage medium to authorize the password for a user.

12. The computer-implemented method of claim 1, wherein the password is formed for a user, and the method further comprises:
   comparing the password to a pre-stored password;
   selectively permitting or denying the user access to an object, based on a result of said comparing step.

13. A computer program product, the computer program product comprising a non-transitory computer readable storage medium having program instructions embodied therewith, the program instructions executable by a computer implementing a password management system to cause the computer to perform a method comprising:
   generating, by the password management system using a set of Hardware Random Number Generators (HRNGs), at least one salt based on statistics of a set of random numbers with given unique distributions generated by the set of HRNGs; and
   forming, by a processor of the computer, a hashed password based on the at least one salt; and
   configuring different internally determined distributions to be randomly determined at a production time;
   wherein a subsequent forming of the hashed password comprises recalculating, using the HRNGs, the given unique distributions to generate the at least one salt in place of recording the at least one salt, and
   wherein, for each of a plurality of users, a different pair of HRNGs from the set are used for password authorizing, one of the HRNGs from the different pair being physically located at and connected to an authorizing device of the password managing system and another one of the HRNGs from the different pair being physically located at and connected to a respective one of a plurality of user devices.

14. The computer program product of claim 13, wherein a respective different HRNG from the set is used for each of a plurality of user devices.

15. The computer program product of claim 13, wherein the HRNGs in the set each generate the random numbers from different internally determined distributions.

16. A password management system, comprising:
   a set of Hardware Random Number Generators (HRNGs) for generating at least one salt based on statistics of a set of random numbers with given unique distributions generated by the set of HRNGs; and
   a processor for forming a hashed password based on the at least one salt,
   wherein different internally determined distributions are configured to be randomly determined at a production time,
   wherein a subsequent forming of the hashed password comprises recalculating, using the HRNGs, the given unique distributions to generate the at least one salt in place of recording the at least one salt, and
   wherein, for each of a plurality of users, a different pair of HRNGs from the set are used for password authorizing, one of the HRNGs from the different pair being physically located at and connected to an authorizing device of the password managing system and another one of the HRNGs from the different pair being physically located at and connected to a respective one of a plurality of user devices.

* * * * *